United States Patent [19]

Edwards

[11] Patent Number: 4,836,286
[45] Date of Patent: Jun. 6, 1989

[54] METHOD FOR REMOVAL OF FLOW-RESTRICTING MATTER FROM HYDROCARBON PRODUCING WELLS

[75] Inventor: Lloyd Edwards, Killeen, Tex.

[73] Assignee: E.F.L. Electro-Flood Ltd., Calgary, Canada

[21] Appl. No.: 232,157

[22] Filed: Aug. 15, 1988

[51] Int. Cl.$^4$ .............................................. E21B 37/06
[52] U.S. Cl. ................... 166/304; 166/65.1; 166/312
[58] Field of Search .......... 166/304, 305.1, 311, 166/312, 371, 65.1, 67, 300, 248; 252/8.3, 8.552; 134/26, 40

[56] References Cited

U.S. PATENT DOCUMENTS

| | | | |
|---|---|---|---|
| 2,217,857 | 10/1940 | Byck | 166/902 X |
| 3,228,878 | 1/1966 | Moody | 166/304 X |
| 3,437,146 | 4/1969 | Everhart et al. | 166/304 X |
| 3,530,936 | 9/1970 | Gunderson | 166/65.1 X |
| 4,407,367 | 10/1983 | Kydd | 166/304 X |

FOREIGN PATENT DOCUMENTS 1102904  7/1984  U.S.S.R. .............................. 166/304

*Primary Examiner*—Bruce M. Kisliuk
*Attorney, Agent, or Firm*—Jon C. Winger

[57] ABSTRACT

A method for removing flow-restricting matter such as paraffin, asphalts, clays, scales, or gyps from production equipment and producing formation of and in the vicinity of an oil or gas well. The method uses a combination of solutions consisting of mixed solvents and additives such as detergents, surfactants and acids. The solutions are electrolyzed along with the hydrocarbon product of the well in an above-ground reaction chamber. The electrolyzed mixture of solutions and hydrocarbon product are reintroduced immediately down the well casing and into the well formation.

18 Claims, 1 Drawing Sheet

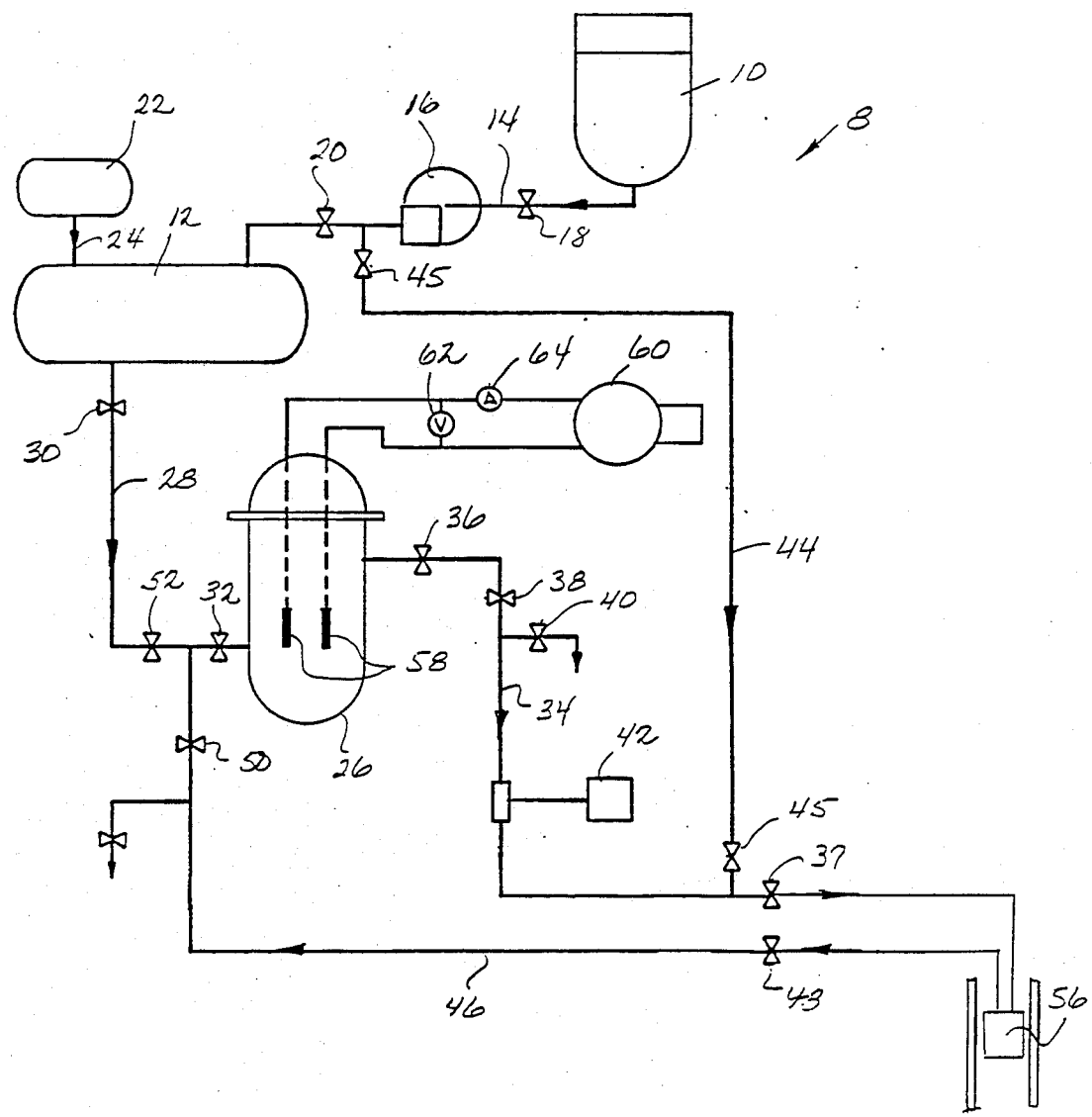

METHOD FOR REMOVAL OF FLOW-RESTRICTING MATTER FROM HYDROCARBON PRODUCING WELLS

BACKGROUND OF THE INVENTION

1. Field of the Invention

The invention relates to an economical method and apparatus for increasing the production of liquid or gaseous hydrocarbon material from subterranean deposits or wells and more particularly to increasing such production by removing flow restricting material from the production equipment and well.

2. Background of the Invention

The hydrocarbon production rate from hydrocarbon wells is known to decrease with time due to a build-up of deposits of contaminants in the ducts and pumps of the recovery or production equipment, in the well bore, and interstices or matrix of the well formation which restrict hydrocarbon flow. Eventually production diminishes to a level at which the difference between production costs and the value of the hydrocarbon product recovered is too low to warrant continued production.

The removal of flow restricting materials from the recovery equipment and well formation can extend both the economic life of the well and increase net well production volume.

It is the object of this invention to reduce flow-restriction caused by a build-up of contaminants such as asphalts, paraffins, clays, scales, silt and debris within the well formation, well bore, and hydrocarbon recovery equipment thereby increasing the flow of recoverable hydrocarbons to a recovery point outside the well.

SUMMARY OF THE INVENTION

The present invention provides a method for the dispersal and removal of flow restricting matter from a hydrocarbon producing well which includes introducing a first solvent for dissolving asphalt, wax, or a combination of asphalt and wax, into the well, introducing a second solvent for dissolving silt and scale into the well, removing the mixture of first solvent including solutes, the second solvent including solutes, and hydrocarbon liquid product from the well, electrolyzing the mixture, and reintroducing the electrolyzed mixture back into the well.

BRIEF DESCRIPTION OF THE DRAWING

The FIGURE shows a schematic diagram of the apparatus used to perform the disclosed method.

DETAILED DESCRIPTION OF THE PREFERRED EMBODIMENTS

As shown in the FIGURE, the apparatus 8 comprises an atmospheric tank 10 for containing treatment chemicals in liquid flow communication with a pressure vessel 12 by a first interconnecting conduit 14 interconnecting the outlet of the atmospheric tank 10 to the liquid inlet of the pressure vessel 12. A transfer pump 16 is located in the first interconnecting conduit 14 to pump liquid treatment chemicals from the atmospheric pressure tank 10 to the pressure vessel 12. A flow control valve 18 is located in the first conduit 14 between the outlet of atmospheric pressure tank 10 and the transfer pump 16 to selectively open and close liquid chemical flow communication from the atmospheric pressure tank 10 to the transfer pump 16, and a pressure vessel inlet valve 20 is located in the first conduit 14 between the transfer pump 16 and the inlet into pressure vessel 12 to selectively open and close liquid chemical flow communication from the transfer pump 16 to the pressure vessel 12. An air compressor 22 is in air flow communication with the pressure vessel 12 by a second interconnecting conduit 24 interconnecting the high pressure outlet of the compressor to an air inlet of the pressure vessel 12 to maintain a predetermined pressure within the pressure vessel 12. A pressure gage is connected to the pressure vessel 12 to monitor the pressure within the pressure vessel 12. An electrode chamber 26 is in liquid flow communication with the pressure vessel 12 by a third interconnecting conduit 28 interconnecting the liquid outlet of the pressure vessel 12 to the liquid inlet of the electrode chamber 26. A pressure release valve 30 is located in the third interconnecting conduit 28 immediately downstream of the liquid outlet of the pressure vessel 12 which opens at a predetermined pressure interior of the pressure vessel 12 to allow pressurized liquid chemicals to flow through the third interconnecting conduit 28 to the electrode chamber 26. A blocking valve 32 is also located in the third conduit 28 immediately upstream of the inlet into the electrode chamber 26 to selectively provide for the flow of liquid treatment chemicals into the electrode chamber 26 from the conduit 28. The liquid outlet of the electrode chamber 26 is in liquid flow communication with the well casing by an outlet conduit or fourth interconnecting conduit 34 for supplying the liquid treatment chemicals to the well. A valve 36 is located in the fourth interconnecting conduit 34 immediately downstream of the electrode chamber outlet and another valve 37 is located in the conduit 34 near the end of the conduit upstream of the well casing to selectively allow liquid chemicals to flow from the electrode chamber 26 to the well casing. A check valve 38 is also located in the fourth interconnecting conduit 34 to prevent liquid chemicals from flowing back into the electrode chamber 26 through the fourth conduit 34. The fourth conduit 34 can also include a chemical sample valve controlled faucet 40 downstream of the check valve 38 for drawing a sample of the liquid chemicals flowing from the electrode chamber 26 for testing purposes. A volume rate of flow counter 42 is connected to the fourth interconnecting conduit 34 for monitoring the volume rate of flow of the liquid chemicals flowing in the fourth conduit 34 from the electrode chamber 26 of the well. A bypass conduit 44 interconnects the first interconnecting conduit 14 to the fourth conduit 34 to bypass the pressure vessel 12 and electrode chamber 26. The bypass conduit 44 is connected to the first conduit 14 between the outlet of the transfer pump 16 and the pressure vessel inlet valve 12, and is connected to the fourth conduit 34 downstream of the volume rate of flow counter 42. Blocking valves 45 are located in the bypass conduit 44 to control the flow of liquid therethrough. A return or fifth conduit 46 interconnects the well casing to the third interconnecting conduit 28 for returning or recycling liquid treatment chemicals and hydrocarbon liquid to the electrode chamber 26 from the well. The return conduit 46 interconnects the well casing to the third conduit 28 at a location in the third conduit 28 downstream of the pressure release valve 30 and upstream of the blocking valve 32 in the third conduit at inlet into the electrode chamber 26. An appropriate blocking valve 48 is located in the return conduit 46 to selectively provide for the flow of returning liquid treatment chemicals and hydrocarbon liquid from the well through the return conduit 46 to the electrode chamber 26 through the return conduit 46. A valve 50 is also located in the return conduit 46 immediately downstream of the intersection of the return conduit 46 and the third conduit 28 to selectively prevent the flow of liquid treatment chemical from the pressure vessel 12 into the return conduit 46. The return conduit 46 can also include a chemical sample valve controlled faucet 54 upstream of the valve 50 for draining a sample of the liquid chemical returning from the well for purposes of testing it. In addition, a check valve 52 is located in the third conduit 28 upstream of the intersection of the return conduit 46 and the third conduit 28 to prevent the returning liquid treatment chemicals from flowing into the third conduit 28 into the pressure vessel 12. A pump 56 in liquid flow communication with both the outlet conduit 34 and return conduit 46 is located within the well casing to circulate the liquid chemical therein and return it through the return conduit 46.

Carbon rod electrodes 58 are located within the electrode chamber 26 and are energized by, for example, an AC generator 60 located outside the electrode chamber 20. An appropriate voltage meter 62 and current meter 64 are also associated with the AC generator 60 to monitor the output of the AC generator.

The chemical treating liquid is comprised of two constituents. These two constituents will be hereinafter referred to as a first solvent for dissolving asphalt, paraffin, or a combination of asphalt and paraffin; and a second solvent for dissolving inorganic deposits such as scale, silt and clays. Optionally, a third constituent, hereinafter referred to as a starter solution, can be included to generate heat for releasing gases from the treating liquid and the hydrocarbon product from the well.

The specific composition of the first solvent will vary somewhat depending upon whether the flow restricting material to be removed thereby is asphaltic based or paraffin based, or a combination. Regardless, the first solvent comprises a detergent for breaking up the asphalt or paraffin deposits permitting aqueous suspension of these deposits, and hydrocarbon solvents. One preferred first solvent wherein the flow restricting material is primarily asphalt comprises a detergent, for example a detergent of the type sold by Pilot Chemical Company under the brand designation TS-40, and three hydrocarbon solvents having different solubilities. Examples of such solvents are turpene and kerosene which are a moderate weight solvent, Methanol which is a light weight solvent, and benzene which is a heavy weight solvent. One preferred first solution wherein the flow restricting material is primarily paraffin comprises a detergent, for example a detergent of the type sold by Pilot Chemical Company under the brand designation T-60, and three hydrocarbon solvents having different solubilities. Examples of such solvents are turpene and kerosene which are a moderate weight solvent, toluene, benzene, acetone, hexane and trichloroethene which are heavy weight solvents, and isopropanol, methanol, and xylol which are light weight solvents.

It should be noted that the first solvent is comprised mostly of light hydrocarbon materials.

Optionallly, it is contemplated that a component be also added to the first solvent as a conductivity enhancer for removing the static electric charge often existing around a well which is created by the original drilling operation. Such an electrical enhancer is Status 450.

If the flow restricting material is a combination of asphaltic and paraffin first solvents, then a combination of the different components of the above asphaltic and paraffin formulas can be used as the first solvent.

The amount of each of the components of the first solvent will vary depending upon, for example, the depth of the formation of flow restricting material to be removed.

It has been determined that for each 1,200 feet of depth of an asphaltic based flow restricting material formation, the following amounts of each chemical component works well:

1 quart—detergent (TS-40),
6 gallons—Turpene
6 gallons—Kerosene,
6 gallons—Methanol,
6 gallons—Benzene.

It has been determined that for each 1,200 feet of depth of a paraffin based flow restricting material formation, the following amounts of each chemical component works well:

$8\frac{7}{8}$ gallons—Turpene
$3\frac{5}{8}$ gallons—Kerosene,
10 gallons—Hexane,
10 gallons—Trichloroethene,
2 ounces—detergent (T-60),
2 gallons—Toluene,
3 gallons—Benzene,
2 gallons—Isopropyl Methanol,
1 gallon—Acetone.

The specific composition of the second solvent comprises a solution of water, acid, and solvent. The second solvent is particularly useful when the flow restricting material comprises a substantial portion of paraffin in addition to silt and scale. An example of a second solvent is a solution of water, preferably sulfamic acid, and solvents such as xylol, hexane, benzene, isopropanol, methanol, and butanol.

It has been determined that for each 1,200 feet of depth of either of the asphalt formation or paraffin flow restricting material formation, the second solvent having the following amounts of each chemical component works well:

40 gallons—Sterile Water,
3 pounds—Sulfamic acid,
2 gallons—Hexane,
2 quarts—Xylol,
3 gallons—Benzene,
1 gallon—Butanol,
1 gallon—Isopropanol,
1 gallon—Methanol.

The starter solution comprises an aqueous solution of an acid, a base, and a wetting agent. Preferably, the acid is one which will not attack metals. Most preferably, the starter solution comprises sulfamic acid, soda ash, and a wetting agent of the type sold by Dupont Petroleum Chemicals Division of Dupont Corp. in Wellington, Delaware under the brand designation of Van Wet 98.

The amount of each component of the starter solution will vary depending upon, for example, the depth of the flow restricting material formation to be removed.

It has been determined that for each 1,200 feet of depth of an asphalt flow restricting material formation, the following amounts of each chemical component works well:

3 pounds—Sulfamic Acid, 1 pound—Soda Ash,
3 pounds—Van Wet 98,
10 gallons—Sterile Water.

In the process of the present invention to eliminate paraffin formations in the well, as a first step, the chemical components of the first solvent are blended together in the atmospheric tank 10 to obtain an acceptable mixture consistency. The first solvent is then pumped out of the atmospheric tank 10 by the transfer pump 16 through the bypass conduit 44 into the well casing by passing the pressure vessel 12 and electrode chamber 26. This is accomplished by closing valves 20, 45, and 37. The first solvent is allowed to stabilize in situ in the well for a first period of time, on the order, for example of thirty minutes, before the second step is carried out. As the second process step the chemical components of the second solvent are blended together in the atmospheric tank 10 to obtain an acceptable mixture consistency. The second solvent is then pumped out of the atmospheric tank 10 by the transfer pump 16 through the bypass conduit 44 into the outlet or fourth conduit 34 into the well wherein it combines with the first solvent previously pumped into the well. The second solvent is allowed to stabilize with the first solvent in situ in the well for a second period of time, on the order of, for example, twelve hours, during which time the first solvent in combination with the second solvent begins reacting with the paraffin formations. As a third step, the chemical mixture of the first solvent and second solvent along with admixed hydrocarbon liquid product from the well is pumped from the well through the return conduit 46 into the electrode chamber 26. This can be accomplished by closing valve 37 in the outlet conduit 34, opening valves 48 and 50 in the return conduit 46, closing valve 52 and opening valve 32 in the third conduit 28, and activating the pump 56 in the well casing. The voltage and current of the AC generator 60 is adjusted to provide sufficient energy to the electrodes 36 for a sufficient length of time to increase the viscosity of the hydrocarbon liquid, vaporize natural gases in the hydrocarbon liquid and chemical treating liquid, and impart a residual electric field to the hydrocarbon liquid. It has been determined that a voltage of about 100 volts and a potential of 500 amperes works well. The valves 30 and 52 in the third conduit 28 are opened and the valves 36, 38 and 37 in the outlet conduit 34 are opened so that the liquid in the electrode chamber 26 is pumped by air pressure from the pressure vessel 12 through the outlet conduit 37 back into the well. As may be needed, the admixture of first solvent, second solvent, starter solution and hydrocarbon product can be pumped from the well and recirculated back through the electrode chamber 26 and then back to the well.

In the process of the present invention to eliminate asphalt formations in the well, as a first step the chemical components of the first solvent are blended together in the atmospheric tank 10 to obtain an acceptable mixture consistency. The first solvent is then pumped out of the atmospheric tank 10 by the transfer pump 16 through the bypass conduit 44 into the outlet or fourth conduit 34 into the well casing by passing the pressure vessel 12 and electrode chamber 26. This is accomplished by closing valves 20, 45 and 37. The first solvent is allowed to stabilize in situ in the well for a first period of time, on the order of for example thirty minutes, before the second step is carried out. As the second process step the chemical components of the second solvent are blended together in the atmospheric tank 10 to obtain an acceptable mixture consistency. The second solvent is then pumped out of the atmospheric tank 10 by the transfer pump 16 through the bypass conduit 44 into the outlet or fourth conduit 34 into the well wherein it combines with the first solvent previously pumped into the well. The second solvent is allowed to stabilize with the first solvent in situ in the well for a second period of time greater than the first period of time, for example on the order of twelve hours, during which time the first solvent in combination with the second solvent begins reacting with the asphaltic formations. As the third step, the chemical components of the starter solution are blended together in the atmospheric tank 10 to obtain an acceptable mixture consistency. The starter solution is then pumped to the pressure vessel 12 and then to the electrode chamber 26 under the influence of the air pressure in the pressure vessel 12. This is accomplished by opening the valve 20 in the first conduit 14, opening the valves 52 and 53 in the third conduit 28, closing the valve 45 in the bypass conduit 44, and closing the valve 50 in the return conduit 46. The electrodes 58 are activated by the AC generator 60. The electrolysed starter solution, having a residual electric charge or field, is pumped out of the electrode chamber 26 through the fourth conduit 34 under the influence of the compressed air from the pressure vessel 12, into the well wherein it mixes with first solvent and second solvent previously pumped into the well. This is accomplished by opening valves 36, 38 and 37 in the outlet conduit 34. As a fourth step, the chemical mixture of the first solvent, second solvent, and starter solution along with admixed hydrocarbon liquid product from the well is pumped from the well through the return conduit 46 into the electrode chamber 26. This can be accomplished by closing valve 37 in the outlet conduit 34, opening valves 48 and 50 in the return conduit 46, closing valve 52 and opening valve 32 in the third conduit 28, and activating the pump 56 in the well casing. The voltage and current of the AC generator 60 is adjusted to provide sufficient energy to the electrodes 58 for a sufficient length of time to increase the viscosity of the hydrocarbon liquid, vaporize natural gases in the hydrocarbon liquid and the chemical treating liquid, and impart a residual electric field to the hydrocarbon liquid. It has been determined that a voltage of about 100 volts and a potential of 500 amperes works well. The valves 30 and 52 in the third conduit 28 are opened and the valves 36, 38 and 2 in the outlet conduit 34 are opened so that the liquid in the electrode chamber 26 is pumped by air pressure from the pressure vessel 12 through the outlet conduit 34 back into the well.

The process for removing asphalt formations in the well, it is contemplated that, optionally, the first solvent be routed through the electrode chamber 26 wherein it is electrolyzed prior to initially introducing the first solvent into the well.

As may be needed, the admixture of first solvent, second solvent, starter solution, and hydrocarbon product can be pumped from the well and recirculated back through the electrode chamber and then back to the well.

The foregoing detailed description is given primarily for clearness of understanding and no unnecessary limitations are to be understood thereby.

I claim:

1. A method for the dispersal and removal of flow-restricting matter from hydrocarbon producing wells comprising the steps of:
   making a first solvent, comprising a detergent, and a hydrocarbon solvent;
   introducing the first solvent into the hydrocarbon producing well;
   allowing the first solvent to remain in situ in the hydrocarbon producing well for a first predetermined period of time;
   making a second solvent comprising an acid and a hydrocarbon solvent;
   introducing the second solvent into the hydrocarbon producing well;
   allowing the second solvent to remain in situ in the hydrocarbon producing well for a second predetermined period of time with the first solvent;
   removing the mixture of first solvent, second solvent, and hydrocarbon liquid product from the well;
   passing an electrical charge through the mixture of first solvent, second solvent, and hydrocarbon liquid product of sufficient energy to electrolyze the mixture; and,
   returning the electrolyzed mixture back to the well.

2. The method of claim 1, further comprising the steps of:
   removing the previously electrolyzed mixture and additional hydrocarbon liquid product which has subsequently mixed with the previously electrolyzed mixture resulting in a second mixture from the well;
   passing an electrical charge through this second mixture of sufficient energy to electrolyze the second mixture; and,
   returning the electrolyzed second mixture back to the well.

3. The method of claim 1, further comprising, following the step of allowing the second solvent to remain in situ, the steps of:
   making an aqueous starter solution of an acid, a base, and a wetting agent;
   passing an electrical charge through the starter solution;
   introducing the starter solution into the hydrocarbon producing well; and
   allowing the starter solvent to remain in situ in the hydrocarbon producing well for a period of time with the first solvent and second solvent.

4. The method of claim 1, wherein the step of making the first solvent comprises blending three hydrocarbon solvents having different solubilities with the detergent.

5. The method of claim 4, wherein the different hydrocarbon solvents are selected from the group consisting of turpene, kerosene, methanol, and benzene, and combinations thereof.

6. The method of claim 4, wherein the different hydrocarbon solvents are selected from the group consisting of turpene, kerosene, xylol, isopropanol, methanol, hexane, trichloroethene, toluene, benzene, and acetone.

7. The method of claim 1, wherein the step of making the first solvent comprises blending an electrical conductivity enhancer with the detergent and hydrocarbon solvent.

8. The method of claim 3, wherein the acid of the starter solution is sulfamic acid.

9. The method of claim 3, wherein the base of the starter solution is soda ash.

10. A method for dispersal and removal of flow-restricting matter from hydrocarbon producing wells comprising the steps of:
    making a first solvent comprising a detergent, and a hydrocarbon solvent;
    passing an electrical charge through the first solvent;
    introducing the electrolyzed first solvent into the hydrocarbon producing well;
    allowing the first solvent to remain in situ in the hydrocarbon producing well for a first predetermined period of time;
    making a second solvent comprising an acid and a hydrocarbon solvent;
    introducing the second solvent into the hydrocarbon producing well;
    allowing the second solvent to remain in situ in the hydrocarbon producing well for a second predetermined period of time with the first solvent;
    removing the mixture of first solvent, second solvent, and hydrocarbon liquid product from the well;
    passing an electrical charge through the mixture of first solvent, second solvent, and hydrocarbon liquid product of sufficient energy to electrolyze the mixture; and
    returning the electrolyzed mixture back to the well.

11. The method of claim 10, further comprising the steps of:
    removing the previously electrolyzed mixture and additional hydrocarbon liquid product which has subsequently mixed with the previously electrolyzed mixture resulting in a second mixture from the well;
    passing an electrical charge through this second mixture of sufficient energy to electrolyze the second mixture; and,
    returning the electrolyzed second mixture back to the well.

12. The method of claim 10, further comprising, following the step of allowing the second solvent to remain in situ, the steps of:
    making an aqueous starter solution of an acid, a base, and a wetting agent;
    passing an electrical charge through the starter solution; and,
    introducing the starter solution into the hydrocarbon producing well; and
    allowing the starter solvent to remain in situ in the hydrocarbon producing well for a period of time with the first solvent and second solvent.

13. The method of claim 10, wherein the step of making the first solvent comprises blending three hydrocarbon solvents having different solubilities with the detergent.

14. The method of claim 13, wherein the different hydrocarbon solvents are selected from the group consisting of turpene, kerosene, methanol, and benzene, and combinations 15. The method of claim 13, wherein the different hydrocarbon solvents are selected from the group consisting of turpene, kerosene, xylol, isopropanol, methanol, hexane, trichloroethene, toluene, benzene, and acetone.

16. The method of claim 10, wherein the step of making the first solvent comprises blending an electrical conductivity enhancer with the detergent and hydrocarbon solvent.

17. The method of claim 12, wherein the acid of the starter solution is sulfamic acid.

18. The method of claim 12, wherein the base of the starter solution is soda ash.

* * * * *